J. NOWAK.
APPARATUS FOR SOLVING EQUATIONS.
APPLICATION FILED NOV. 29, 1910.
1,070,835.  Patented Aug. 19, 1913.
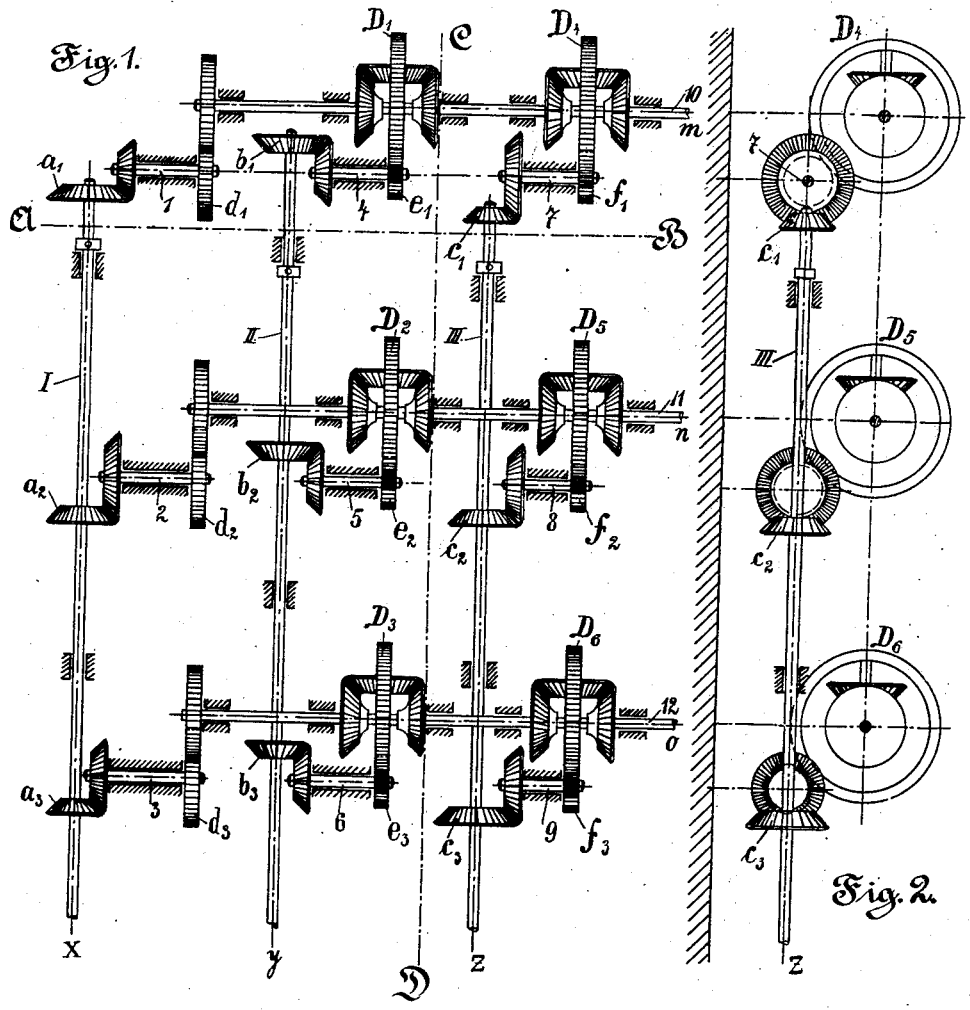
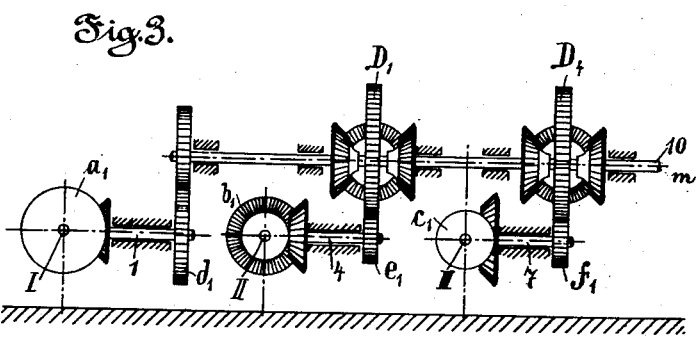
Witnesses:  Inventor.

UNITED STATES PATENT OFFICE.

JOSEF NOWAK, OF MUNICH, GERMANY.

APPARATUS FOR SOLVING EQUATIONS.

1,070,835.  Specification of Letters Patent.  Patented Aug. 19, 1913.

Application filed November 29, 1910. Serial No. 594,761.

*To all whom it may concern:*

Be it known that I, JOSEF NOWAK, a subject of the German Emperor, and residing at Munich, Germany, have invented certain new and useful Improvements in Apparatus for Solving Equations, of which the following is a specification.

The subject-matter of my invention is apparatus for solving equations having any number of unknown quantities.

My apparatus consists of gearing, in which the known coefficients of the equations to be solved are represented by the radii or numbers of teeth of wheels, while the unknown and the absolute terms are represented by the angles of rotation or numbers of revolutions of the wheels.

One illustrative embodiment of my invention is represented in the accompanying drawing, wherein:—

Figure 1 is a side elevation, Fig. 2 a vertical section taken on the line C—D in Fig. 1 and Fig. 3 a horizontal section taken on the line A—B in Fig. 1.

I will explain the drawing in the following manner: All linear equations may be brought into the form:

$$a_1x + b_1y + c_1z \ldots = m$$
$$a_2x + b_2y + c_2z \ldots = n$$
$$a_3x + b_3y + c_3z \ldots = o$$

The terms of these equations forming a vertical row, *i. e.*:

$$a_1x$$
$$a_2x$$
$$a_3x$$

or $$b_1y$$
$$b_2y$$
$$b_3y$$

and so on, may be designated as columns, and I provide a shaft I, II, III for each column. Fast on the shaft are bevel-gears $a_1$, $a_2$, $a_3$, $b_1$, $b_2$, $b_3$, $c_1$, $c_2$, $c_3$, which respectively drive the axles 1, 2, 3 ... 9. The gears are so selected that the ratios of transmission of shaft I to axle 1, shaft I to axle 2, shaft I to axle 3, and shaft II to axle 4, shaft II to axle 5, and so on, correspond to the known values of the columns, *i. e.* $a_1$, $a_2$, $a_3$, $b_1$, $b_2$ ... $c_3$.

Fast on the axles 1, 2 ... 9 are spur-gears $d_1$, $d_2$, $d_3$, $e_1$, $e_2$, $e_3$, $f_1$, $f_2$, $f_3$, each having a definite number of teeth, meshing directly or indirectly with differential gears $D_1$, $D_2$ ... $D_6$ driving axles 10, 11, 12.

My apparatus operates as follows: Assuming that the values $x$, $y$, $z$, *i. e.* the numbers of revolutions of the shafts I, II, III are known, the axle 1 will rotate $x.a_1$ revolutions, the axle 2 will rotate $x.a_2$ revolutions, and so on up to the axle 9 rotating $z.c_3$ revolutions. The products $x.a_1$, $x.a_2$ ... $z.c_3$ are transmitted by the spur-gears $d_1$, $d_2$ ... $f_3$ to the differential gears $D_1$, $D_2$ ... $D_6$ and added by these in known manner. The numbers of revolutions of the axles 10, 11, 12 driven by the differential gears represent the absolute values $m$, $n$, $o$ of the equations. Reversely, the values $x$, $y$, $z$ are obtained when the shafts 10, 11, 12 are rotated corresponding to the values $m$, $n$, $o$. The absolute values $m$, $n$, $o$ can be set and the members $x$, $y$, $z$ read off very simply by means of scales and pointers or by counting mechanism.

Instead of gears, friction wheels, disks and the like may be employed. Also the addition can be brought about by other well-known means instead of by differential gears, and in order to be able readily to vary the known coefficients, cone-wheels or other known means for varying the ratio of transmission may be employed.

My apparatus is particularly suitable for calculating the currents and voltages in systems of conductors for supplying electricity. In such systems there are as many unknown quantities and equations as there are points of junction, and as the system of a large town contains several hundred such points, the calculation is exceedingly laborious, particularly as the work increases almost as the square of the number of points of junction. These equations have the form:

$$+e_1g_{11} - e_2g_{12} - e_3g_{13} = i_1$$
$$-e_1g_{21} + e_2g_{22} - e_3g_{23} = i_2$$
$$-e_1g_{31} - e_2g_{32} + e_3g_{33} = i_3$$

and so on. In these equations, the values $e_1$, $e_2$, $e_3$ ... designate the voltages at the points of junction; $g_{11}$, $g_{12}$ ... the electrical conductivity of the feeders; $i_1$, $i_2$, $i_3$ the currents at the points of junction.

Now in existing electricity works it is constantly necessary to investigate the influence of a new load, *i. e.* a change of the values $i_1$, $i_2$, $i_3$ and so on. In electricity works the values $g_{11}$, $g_{12}$, $g_{13}$ ... remain constant. Consequently they can be represented by non-changing means, such as gears and the like, whereas the variables, e. g. the currents, are represented by a readily variable means, in the present case the number of revolutions, so that my invention differs in a very important respect from known machines for solving equations.

It is particularly to be observed that the various values of the current between the points of junction, e. g. the algebraic sum $e_1, g_{12} - e_2, g_{12}$, can be ascertained similarly with the same machine.

I claim:—

1. An apparatus for solving equations, comprising a plurality of driving shafts; a plurality of driven shafts each divided into a plurality of sections; a differential between the respective adjacent sections of each driven shaft; connections for communicating rotation between each driving shaft and a section respectively of each driven shaft; and connections for communicating rotation from each of the remainder of the driving shafts to each corresponding differential of each respective driven shaft.

2. An apparatus for solving equations, comprising a plurality of driving shafts; a plurality of driven shafts each divided into a plurality of sections; a differential between the respective adjacent sections of each driven shaft; connections for communicating rotation between each driving shaft and a section respectively of each driven shaft; and connections for communicating rotation from each of the remainder of the driving shafts to each corresponding differential of each respective driven shaft, the driving ratios of the respective connections of each shaft being different.

3. An apparatus for solving equations comprising three driving shafts; three driven shafts, each divided into three sections; a differential between the respective adjacent sections of each driven shaft; and a bevel gear connection between a driving shaft and a section respectively of each driven shaft, and between a driving shaft and each corresponding differential of each driving shaft, the ratios of the gear connections of each driving shaft being different.

JOSEF NOWAK.

Witnesses:
A. V. W. COTTER,
MATHILDE K. HELD.